(12) United States Patent
Wong et al.

(10) Patent No.: US 8,866,702 B1
(45) Date of Patent: Oct. 21, 2014

(54) USE OF OPTICAL DISPLAY SYSTEM AS A VISUAL INDICATOR FOR A WEARABLE COMPUTING DEVICE

(75) Inventors: Adrian Wong, Mountain View, CA (US); Russell Mirov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/418,867

(22) Filed: Mar. 13, 2012

(51) Int. Cl.
*G09G 5/00* (2006.01)
*G02B 27/01* (2006.01)

(52) U.S. Cl.
CPC .................................... *G02B 27/017* (2013.01)
USPC ........................................ 345/7; 345/8; 345/9

(58) Field of Classification Search
None
See application file for complete search history.

(56) References Cited

U.S. PATENT DOCUMENTS

| | | | |
|---|---|---|---|
| 7,542,012 B2 | 6/2009 | Kato et al. | |
| 2006/0198027 A1* | 9/2006 | Li et al. | 359/630 |
| 2007/0233983 A1* | 10/2007 | Tanaka et al. | 711/163 |
| 2010/0027289 A1 | 2/2010 | Aiki et al. | |
| 2010/0259471 A1* | 10/2010 | Takano et al. | 345/156 |
| 2010/0265163 A1* | 10/2010 | Legerton et al. | 345/7 |
| 2011/0231757 A1 | 9/2011 | Haddick et al. | |

* cited by examiner

*Primary Examiner* — Joseph Haley
(74) *Attorney, Agent, or Firm* — McDonnell Boehnen Hulbert & Berghoff LLP

(57) ABSTRACT

Methods and systems for use of an optical display system as an indicator of a wearable computing device are provided. In one example, a method includes receiving, by the wearable computing device, information for display by an optical display system coupled to the wearable computing device. The method includes in response, making a determination of whether the wearable computing device is in use. The method also includes based on the determination, causing a light source coupled to the wearable computing device to modulate an illumination of the optical display system.

21 Claims, 6 Drawing Sheets

USE OF OPTICAL DISPLAY SYSTEM AS A VISUAL INDICATOR FOR A WEARABLE COMPUTING DEVICE

BACKGROUND

Wearable systems can integrate various elements, such as miniaturized computers, input devices, sensors, image displays, wireless communication devices, and image and audio processors, into a device that can be worn by a user. Such systems can provide a mobile and lightweight solution to communicating, computing, and interacting with a user's environment. With the advance of technologies associated with wearable systems and miniaturized optical elements, it has become possible to consider wearable compact optical display systems that augment the user's experience of a real-world environment.

In one example, by placing an image display element or component close to the user's eye(s), an artificial or virtual computer-generated image can be displayed over the user's view of the real-world environment. One or more such image display elements can be incorporated into optical display systems and referred to generally as near-eye displays, head-mounted displays (HMDs), or heads-up displays (HUDs). Depending upon the size of the display element and the distance to the user's eye, the artificial image may fill or nearly fill the user's field of view.

A wearable computing device may include sensors for sensing any of a number of physical, environmental, or operational elements. A processor of the wearable computing device may be configured to perform actions in response to the signals provided by the sensors. For example, a tactile sensor on a wearable computing device may be used to detect inputs from a user of the wearable computing device. An accelerometer may detect motion of the wearable computing device and provide information to the user.

SUMMARY

In one example, a method is provided that comprises receiving, by a wearable computing device, information for display by an optical display system coupled to the wearable computing device. The method also includes in response, making a determination of whether the wearable computing device is in use. The method further includes based on the determination, causing a light source coupled to the wearable computing device to modulate an illumination of the optical display system.

In another example, a non-transitory computer readable medium having stored therein instructions executable by a computing device to cause the computing device to perform functions is provided. The functions comprise receiving information for display by an optical display system coupled to the computing device, and in response, making a determination of whether the computing device is in use. The functions also comprise based on the determination, causing a light source coupled to the computing device to modulate an illumination of the optical display system.

In another example, a wearable computing device is provided that comprises an optical display system, a light source coupled to the optical display system, and a processor. The processor is configured to receive information for display by the optical display system, and in response, make a determination of whether the wearable computing device is in use. The processor is also configured to based on the determination, cause the light source to modulate an illumination of the optical display system.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
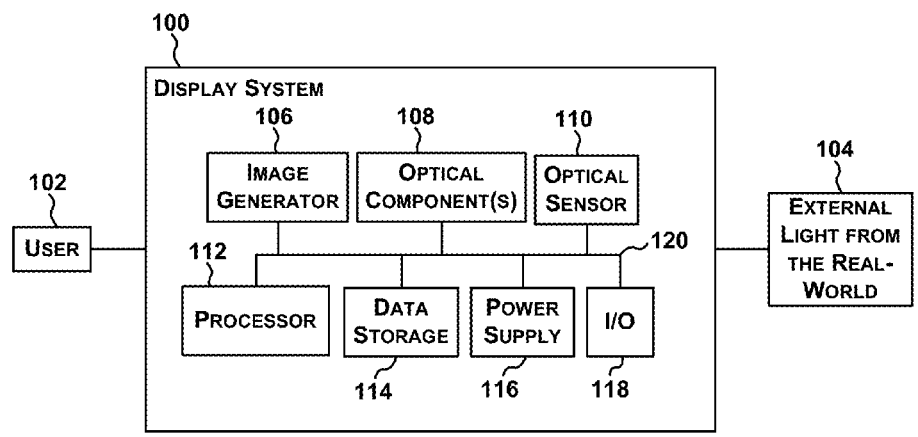
FIG. 1 illustrates a display system in accordance with an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein are methods and systems for use of an optical light pipe as an indicator and methods for arbitration of use. In examples herein, a wearable computing device may be in the form of an eyeglasses configuration or other head-mounted or mountable configuration, and may include a head-mounted display (HMD) that is configured to display items to a user. The wearable computing may also include an optical transport element (e.g., optical light pipe) that delivers information, such as information received from a graphics processor, light source, or the like, to the HMD. In addition to meeting certain size, weight, and manufacture requirements, the optical transport element may have optical characteristics that couple light in and out of the component and retain fidelity of transported information. The wearable computing device and HMD may be configured for use to provide a display close to a wearer's (or user's) eye(s) such that the displayed image fills or nearly fills the field of view, and appears as a normal sized image, such as might be displayed on a traditional image display device. In one example, the wearable computing device may be configured as a near-eye display.

In instances in which the wearable computing device has received information for display by the HMD, and the wearable computing device is not in use (e.g., not being worn by the user), items displayed on the HMD may not be seen by the user. In such instances, the optical transport element may be used to provide an indication light to the user that the wearable computing device has received information for display.

The wearable computing device may be configured to determine instances in which the wearable computing device is not in use or not being worn by a user. In one example, a head on/off detector may be integrated with the wearable computing device to ensure that the optical transport element is operated at user acceptable levels at times when the wearable computing is worn by the user (so as not to cause operation of the indication light which may degrade the user experience). In instances in which the wearable computing device is being worn, received data may be displayed by the HMD for viewing by the user. Thus, an eye detector or other head-worn presence detector may be incorporated within the wearable computing device to cause the indication light to be operated at user-acceptable levels and/or to switch to an HMD display mode.

In examples in which the wearable computing device is not in use, and information has been received for display, the wearable computing device may be configured to flood the optical transport element with light and cause the optical transport element to glow. When doing so, the HMD may be off, or pixels of the HMD may not be operated for display. In one example operation, the wearable computing device may provide an indication or notification (e.g., "ring") when data is received for display by strobing a green light at high power. Lossly light leakage through the optical transport element may be sufficient to illuminate a certain region surrounding the wearable computing device. In other examples, the illumination effect may be enhanced by using electrochromics to make the optical transport element glass frosted. In these examples, light may diffuse through frosted glass, and the strobing light effect may be more apparent. Thus, the wearable computing device may be configured to increase light intensity provided to the optical transport element when the indication light is operated.

Referring now to FIG. 1, a display system 100 in accordance with an example embodiment enables a user 102 to observe a real-world environment and to view a computer-generated virtual image. In FIG. 1, the user's view of the real-world environment is observed by receiving external light 104 from the real world. The illustrated display system 100 includes an image generator 106, one or more optical components 108, an optical sensor 110, a processor 112, data storage 114, a power supply 116, and other input/output ("I/O") components 118. The various components of the display system 100 of FIG. 1 are operatively coupled together by a connection(s) 120, which can represent any number of wired or wireless electrical connections and/or direct or indirect physical or optical couplings, for example.

Generally, the processor 112 is configured to control the image generator 106 to generate a light pattern that is directed through the optical component(s) 108 to form the virtual image that is viewable by the user 102. In addition, the processor 112 and the optical sensor 110 are configured to obtain a representation of the real-world environment, for example, to track the gaze of the user 102. In response to the gaze tracking, the processor 112 may be further configured to control the light pattern generated by the image generator 106 to update or modify the virtual image viewable by the user 102. The virtual image may be updated or modified in response to the gaze tracking by changing the location, size, brightness, content, and/or other properties thereof.

In some examples, the data storage 114 can be any suitable device or computer readable medium that is capable of storing data and instructions that can be executed by the processor 112 to control the image generator 106, to obtain the representation of the real-world environment, to track the gaze of the user 102, and to control other components of the display system 100. The power supply 116 is configured to provide electrical power to the various components of the display system 100 and can be any suitable rechargeable or non-rechargeable power supply. Further the I/O components 118 may include switches, dials, buttons, touch screens, etc. that allow for operation or interaction with the display system 100. The I/O components 118 may also include, for example, speakers, microphones, biometric sensors, environmental sensors, and transmitters and/or receivers for communicating with other devices, servers, networks, and the like.

Figure 2:
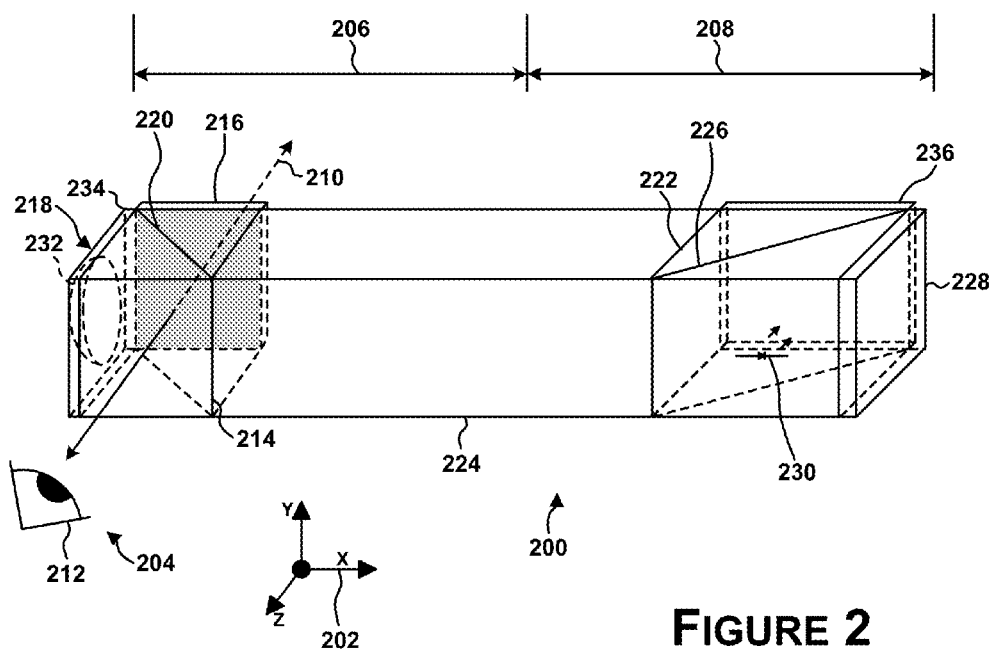
FIG. 2 shows a schematic view of an optical system in accordance with an example embodiment.

FIG. 2 shows a schematic view of an optical system 200 in accordance with an example embodiment. The optical system 200 may be included within a display system, such as the display system 100 in FIG. 1 as one of the optical components 108. For purposes of illustration, the optical system 200 is described with reference to an XYZ coordinate system 202 and in relation to a viewing location 204. The optical system 200 generally includes a first proximal portion 206 and a second distal portion 208. In example operation, the proximal portion 206 is disposed adjacent the viewing location 204 and defines a viewing axis 210 therethrough. An object 212, such as an eye of a user or a camera or other optical sensor, can be positioned generally at the viewing location 204 to view a real-world environment and a computer-generated virtual image. The real-world environment and the virtual image can be viewable simultaneously. For example, the virtual image may overlay a portion of the user's view of the real-world environment. Thus, in examples, an observer at viewing location 204 may view the real-world environment and the virtual image simultaneously, and the virtual image may overlay a portion of the observer's view of the real-world environment.

In FIG. 2, the distal portion 208 extends generally horizontally along the x-axis from the proximal portion 206 such that the distal portion is to the right of the proximal portion from the perspective of the viewing location 204. However, other configurations are possible, for example, the distal portion 208 can be to the left of the proximal portion 206, the optical system 200 can extend vertically with the distal portion located above or below the proximal portion, or the distal portion can extend in any other direction from the proximal portion.

In the illustrated optical system 200, the proximal portion 206 includes a proximal beam splitter 214 that has faces generally parallel to XY, XZ, and YZ planes. In FIG. 2, a viewing window 216 is coupled to a front side of the proximal beam splitter 214 and allows external light into the proximal beam splitter. The viewing axis 210 is defined through the proximal beam splitter 214 and the viewing window 216 and is directed substantially parallel to the z-axis. Generally, in use or operation, the viewing location 204 and the eye of the user 212 are positioned at a back side of the proximal beam splitter 214 so that the user can view the real world through the viewing window 216 and the proximal beam splitter along the viewing axis 210. In some examples, the optical system 200 further includes an image former 218 optically coupled to the proximal beam splitter 214. In one example, the image former 218 is configured to reflect light corresponding to the virtual image in the direction of the x-axis.

The proximal beam splitter 214 of FIG. 2 includes a proximal beam-splitting interface 220 that is configured to combine the external light entering the proximal beam splitter through the viewing window 216 with the light that represents the virtual image generated by the optical system 200 so that the real-world environment and the virtual image can be viewed along the viewing axis 210. In one example, the proximal beam-splitting interface 220 is in a plane that forms about 45-degree angles with the faces of the proximal beam splitter 214 that are in the XY-plane and YZ-plane and is perpendicular to the faces in the XZ-plane. As a result, the proximal beam-splitting interface 220 may intersect the viewing axis 210 at about 45 degrees. It is to be understood, however, that other angles and configurations are possible.

As seen in FIG. 2, the distal portion 208 of the optical system 200 includes a distal beam splitter 222 that has faces generally parallel to XY, XZ, and YZ planes. The distal beam splitter 222 is, in turn, optically coupled to the proximal beam splitter 214 by a light pipe 224, for example. The distal beam splitter 222 includes a distal beam-splitting interface 226 that is generally configured to transmit and reflect light to and from the proximal beam splitter 214 through the light pipe 224. Such transmitted and reflected light can be utilized to generate the virtual image and for gaze tracking. In one example, the distal beam-splitting interface 226 is a plane that forms an angle with the faces of the distal beam splitter 222 that are in the XY-plane and YZ-plane and is perpendicular to the faces in the XZ-plane. The distal beam-splitting interface 226 is arranged at a non-zero angle with respect to the proximal beam-splitting interface 220. In one example, the distal beam-splitting interface 226 is generally orthogonal to the proximal beam-splitting interface 220. However, the orientation of the distal beam-splitting interface 226 may be modified in other examples. For example, the distal beam-splitting interface 226 can be in a plane that is parallel to the proximal beam-splitting interface 220 or parallel to the viewing axis.

In one embodiment, the proximal beam splitter 214, the distal beam splitter 222, and the light pipe 224 are made of glass. Alternatively, some or all of such optical components may be made partially or entirely of plastic, which can also function to reduce the weight of optical system 200. A suitable plastic material is Zeonex® E48R cyclo olefin optical grade polymer, which is available from Zeon Chemicals L.P., Louisville, Ky. Another suitable plastic material is polymethyl methacrylate ("PMMA").

The distal portion 208 further includes a display panel 228 and a light source 230 optically coupled to the distal beam splitter 222. In the present example, the display panel 228 is generally vertically oriented and coupled to a right side of the distal beam splitter 222 and the light source 230 is coupled to a back side of the distal beam splitter. The light source 230 may be or include a light emitting diode (LED) of any color, or a number of LEDs of various colors (e.g., red, green, blue). In addition, more than one light source may be provided, such as to provide a light source capable of illuminating the light pipe 224 with various colors, and a light source capable of white illumination (e.g., for black/white displays or functionality, such as a color filter display). Still further, the light source 230 may be configured to be operated at various illumination intensities, or alternatively, more than one light source may be provided and each may be operated at various illumination intensity levels.

The display panel 228 is configured to generate a light pattern from which the virtual image is formed. The display panel 228 may be an emissive display such as an Organic Light Emitting Diode ("OLED") display. Alternatively, the display panel 228 may be a Liquid-Crystal on Silicon ("LCOS") or a micro-mirror display such as a Digital Light Projector ("DLP") that generates the light pattern by spatially modulating light from a light source, such as the light source 230. The light source 230 may include, for example, one or more light-emitting diodes ("LEDs") and/or laser diodes. The light pattern generated by the display panel 228 can be monochromatic or may include multiple colors, such as red, green, and blue, to provide a color gamut for the virtual image.

In one example of the optical system 200 in use, the light source 230 emits light toward the distal beam-splitting interface 226, which reflects the light toward the display panel 228. The display panel 228 generates a light pattern by spatially modulating the incident light to provide spatially modulated light reflected toward the distal beam-splitting interface 226. The distal beam-splitting interface 226 transmits the spatially modulated light through the light pipe 224 and toward the proximal beam splitter 214. The proximal beam-splitting interface 220 transmits the spatially-modulated light so that the light reaches the image former 218. The image former 218 reflects the spatially-modulated light back toward the proximal beam-splitting interface 220, which reflects the spatially-modulated light toward the viewing location 204 so that the virtual image is viewable along the viewing axis 210.

As a general matter, the reflection and/or transmission of light by and/or through the beam splitters 214, 222 or other optical components of the optical system 200 may refer to the reflection and/or transmission of substantially all of the light or of a portion of the light. Consequently, such terms and descriptions should be interpreted broadly in the present disclosure.

In some embodiments, the proximal and/or distal beam splitters 214, 222 may be polarizing beam splitters, such that the beam splitters preferentially transmit p-polarized light and preferentially reflect s-polarized light, for example. More particularly, in one embodiment, the proximal beam splitter 214 is a polarizing beam splitter that preferentially transmits p-polarized light and preferentially reflects s-polarized light. With this configuration, the external light that is viewable along the viewing axis 210 is generally p-polarized and the light that is viewable along the viewing axis as the virtual image is generally s-polarized. In the present example, the distal beam splitter 222 may be a non-polarizing beam splitter that transmits a portion of the incident light and reflects a portion of the incident light independent (or largely independent) of polarization. The light source 230 may provide s-polarized light that is partly reflected by the distal beam-splitting interface 226 toward the display panel 228. The display panel 228 spatially modulates the incident s-polarized light and also changes its polarization. Thus, in this example, the display panel 228 is configured to convert the incident s-polarized light into a spatially-modulated light pattern of p-polarized light. At least a portion of the p-polarized light is transmitted through the distal beam-splitting interface 226, through the light pipe 224, and through the polarizing proximal beam-splitting interface 220 to the image former 218.

The optical system may be configured to generate a light pattern from which a virtual image can be formed. Referring to FIG. 2, for example, the light pattern may be generated by the display panel 228 and/or the display panel in combination with the light source 230.

In the present example, the image former 218 includes a reflector 232, such as a concave mirror or Fresnel reflector, and/or a quarter-wave plate 234. The p-polarized light passes through the quarter-wave plate 234 and is reflected by the reflector 232 back through the quarter-wave plate 234 toward the proximal beam-splitting interface 220. After the light pattern interacts with the image former 218 in this way, the polarization is changed from p-polarization to s-polarization and the s-polarized, spatially-modulated light is reflected by the proximal beam-splitting interface 220 toward the viewing location 204 so that the virtual image is viewable along the viewing axis 210.

Referring back to FIG. 2, the optical system 200 further includes an optical sensor 236 that is optically coupled to the distal beam splitter 222. In FIG. 2, the optical sensor 236 is generally vertically oriented and coupled to a front side of the distal beam splitter 222. The optical sensor 236 can be a camera, such as a wafer-level camera, an infrared ("IR") camera, a CCD image sensor, a CMOS sensor, and the like, with an image sensing portion of the optical sensor directed towards or facing the distal beam splitter 222. The optical sensor 236 is configured to image the external light entering through the viewing window 216 and viewable by the user along the viewing axis 210 and to image an object 212, such as the user's eye, at the viewing location 204. The optical sensor 236 may be configured to capture still images and/or video. The still images and/or video captured by the optical sensor 236 may substantially correspond to the view of the real world that the user sees when looking through the viewing window 216 and may be processed with the image of the user's eye 212 to determine where in the real world the user is looking. Further, the virtual image viewed by the user can be processed with the image of the user's eye 212 to determine if the user is focusing on a particular portion of the virtual image, such as a particular menu icon or other information.

In an example of the optical system 200 in use, external light from the real world enters through the viewing window 216 and is reflected by the proximal beam-splitting interface 220, through the light pipe 224, and toward the distal beam splitter 222. The distal beam-splitting interface 226 reflects the incident external light to the optical sensor 236 to obtain an image of the real-world environment.

Similarly, light reflected from the user's eye 212 can be directed to the optical sensor 236 to obtain an image of the user's eye 212. In one example, light from the light source 230, the external light, and/or some other light source is reflected from the user's eye 212 toward the proximal beam splitter 214. The proximal beam-splitting interface 220 reflects the incident reflected light toward the image former 218, which reflects the light back through the proximal beam-splitting interface 220, through the light pipe 224, and toward the distal beam splitter 222. The distal beam-splitting interface 226 reflects the incident reflected light toward the optical sensor 236 to obtain an image of the user's eye 212.

In one example, the light reflected from the user's eye 212 is IR light generated by the light source 230 or some other light source coupled to the optical system 200. In this example, the optical sensor 236 can include an IR filter or otherwise be sensitive to IR light. Thus, the reflected light from the user's eye 212 received by the optical sensor 236 can be distinguished from other light that may be incident on the optical sensor, for example, based on wavelength, which in turn allows the optical system 200 to more accurately track the user's gaze. Alternatively or in conjunction, the light source 230 may emit light that is modulated at predetermined frequencies and/or intensities and reflected from the user's eye 212 to the optical sensor 236 so that reflected modulated light can be distinguished from other non-modulated light incident on the optical sensor.

Various modifications can be made to the optical system 200 of FIG. 2 without departing from the spirit of the present disclosure. For example, the optical system 200 of FIG. 2 may be part of the display system 100 of FIG. 1, so as to be coupled to the processor 112, the data storage 114, the power supply 116, and/or the I/O components 118. Such components 112-118 may be coupled to the display panel 228, the light source 230, and/or the optical sensor 236 in any known manner. In another example, the proximal and/or distal beam-splitting interfaces 220, 226 may be curved to account for a curvature of the reflector 232 and/or a curvature of a lens (not shown) of the optical sensor 236.

Referring now to FIGS. 3A-3D, the systems described above in FIGS. 1-2 may be coupled to a head-mounted support in a position such that the viewing axis is conveniently viewable by either a left or right eye of the wearer or user. In this way, an HMD, through which the outside world is viewable, may be provided. The HMD may also function as a wearable computing device. In some examples, the HMD may be considered a head-mounted display, a head-mounted device, or a head-mountable display or device, and does not need to be head mounted for use.

Figure 3A:
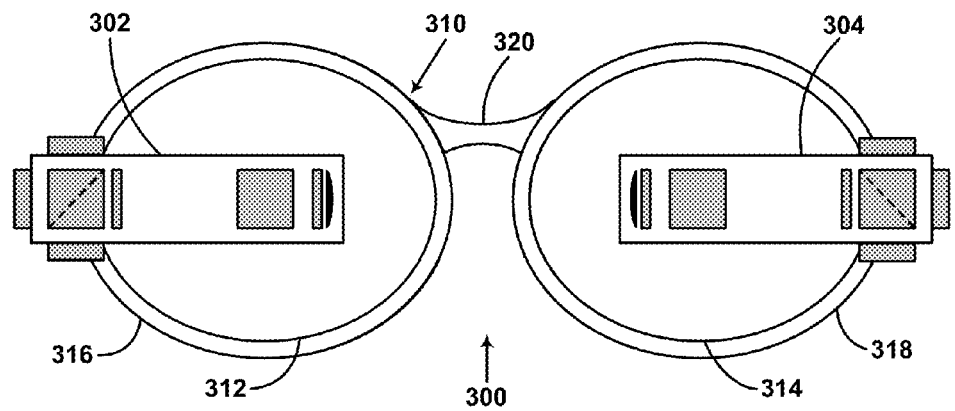
FIGS. 3A-3D illustrate example systems incorporating components of FIGS. 1-2.
Figure 3B:
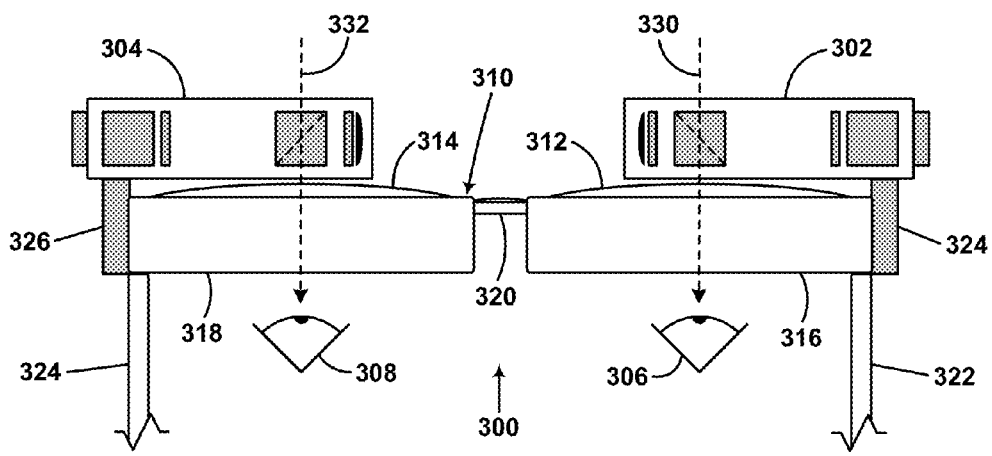
Figure 3C:
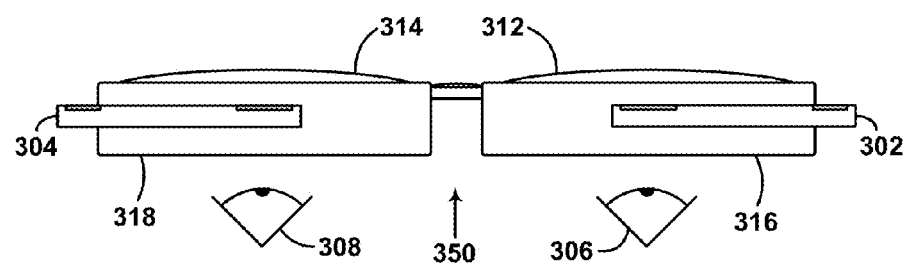

FIG. 3A illustrates a front view of an example HMD 300, FIG. 3B illustrates a top view of the example HMD 300, and FIG. 3C illustrates a top view of another example HMD 350. In FIGS. 3A-3B, the HMD 300 includes see-through display devices 302 and 304 for a wearer's right eye 306 and left eye 308, respectively. The display devices 302, 304 are attached to a head-mountable support 310. In this example, the head-mountable support 310 is configured in the form of eyeglasses with lenses 312, 314 positioned over the right eye 306 and the left eye 308, respectively. The lenses 312, 314 are held in place by respective frames 316 and 318. The head-mountable support 310 also includes a bridge piece 320 that is connected to the frames 316, 318 and is configured to be supported by the bridge of the user's nose. In addition, the head-mountable support 310 includes side-pieces 322 and 324 connected to frames 316, 318, respectively, which may hook behind the user's ears.

Each of the frame elements 316 and 318 and the extending side-pieces 322 and 324 may be formed of a solid structure of plastic and/or metal, or may be formed of a hollow structure of similar material so as to allow wiring and component interconnects to be internally routed through the HMD 300. Other materials may be possible as well. One or more of each of the lens elements 312 and 314 may be formed of any material that can suitably display a projected image or graphic, in some examples. Each of the lens elements 312 and 314 may also be sufficiently transparent to allow a user to see through the lens element. Combining these two features of the lens elements may facilitate an augmented reality or heads-up display where the projected image or graphic is superimposed over a real-world view as perceived by the user through the lens elements 312 and 314.

The extending side-pieces 322 and 324 may each be projections that extend away from the lens-frames 316 and 318, respectively, and may be positioned behind a user's ears to secure the HMD 300 to the user. The extending side-pieces 316 and 318 may further secure the HMD 300 to the user by extending around a rear portion of the user's head. Additionally or alternatively, for example, the HMD 300 may connect to or be affixed within a head-mounted helmet structure. Other possibilities exist as well.

The right-side display device 302 may be attached to the frame 316 by a mount 326 and the left-side display device 304 may be attached to the frame 318 by a mount 328. The mounts 3262, 328 position the display devices 302, 304 so that their respective viewing axes 330, 332 are generally aligned with the user's right eye 306 and left eye 308, respectively. Thus, as shown in FIG. 3B, the viewing axis 330 of the right-side display device 302 may extend to the user's right eye 306 through the lens 312 and the viewing axis 332 of the left-side display device 304 may extend to the user's left eye 308 through the lens 314. To achieve this configuration, the mounts 326, 328 can be fixed mounts or they can be adjustable by the user in order to properly and comfortably align the display devices 302, 304.

Although FIGS. 3A-3B illustrate the HMD 300 with the display devices 302, 304 separate from the lenses 312, 314 and the frames 316, 318, other configurations are possible. For example, some or all of the components of the display devices 302, 304 can be integrated into the lenses 312, 314 and/or the frames 316, 318. For example, beam splitters and light pipes may be integrated into the lenses 312, 314 and/or display panels may be integrated into the frames 316, 318. As an example, the HMD 350 shown in FIG. 3C illustrates the display devices 302 and 304 positioned within the frames 316 and 318. The display devices 302 and 304 may be coupled to the lens 312 and 314 or incorporated within the lens 312 and 314.

In addition, other embodiments may include a display device for only one of the wearer's eyes. In other examples, the HMD 300 or 350 may be configured as goggles, a helmet, a head-band, or a hat. Further, instead of a head-mountable support 310, the support mount can be on a user-mountable support that can be mounted on the user in other ways, such as on one or both of the user's shoulders or on a backpack being worn by the user. Thus, in some example configurations, an optical display system may be provided that is configured to direct light from a light source or display panel located in the temple of the device and to the user's eye(s). In any example configurations, however, an optical display system may be provided that is configured to direct light from a light source or display panel to a user's eye(s).

Figure 3D:
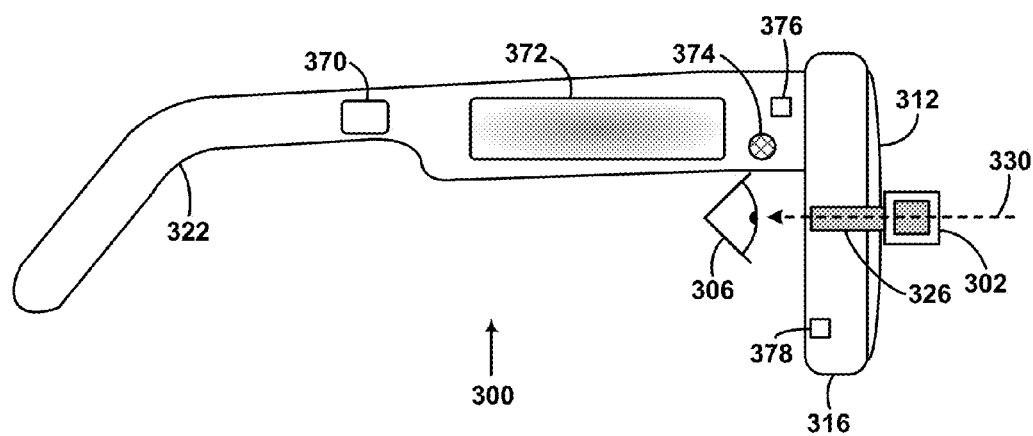

As noted above, the HMD 300 or 350 may function as a head-mountable device or head-mountable display, or more generally as a wearable computing device. FIG. 3D illustrates a side view of the HMD 300. In FIG. 3D, the HMD 300 is shown to include a processor 370, which can be located inside of or attached to part of the side-piece 322. The HMD 300 may be configured to receive, transmit, and display data.

In one embodiment, the processor 370 is configured to control display panels in the display devices 302, 304 to control the virtual images that are generated and displayed to the user. Further, the processor 370 is configured to control optical sensors and to receive images or video captured by the optical sensors. The processor 370 may be communicatively coupled to the display devices 302, 304 by wires inside of the side-piece 322, for example. Alternatively, the processor 370 may communicate with the display devices 302, 304 through external wires or through a wireless connection. The processor 370 may include memory or the HMD 300 may include memory (not shown) that stores software or data accessible by the processor 370.

The HMD 300 may also include other components that are operatively coupled to the processor 370 to provide desired functionality. For example, the HMD 300 may include one or more touchpads, microphones, and sensors, which are exemplified in FIG. 3C by a touchpad 372, a microphone 374, and a sensor 376 on the side-piece 322. However, these components can be located elsewhere in the HMD 300. By appropriate touch interaction with the touchpad 372, the user may control or provide input to the HMD 300. The microphone 374 may be used to receive voice commands from the user and/or to record audio data from the user's surroundings. The sensor 376 may include an accelerometer and/or gyroscope configured to sense movement of the HMD 300. The sensor 376 may also include a global positioning system receiver for determining the location of the HMD. The sensor 376 may also be configured as a light source that may be operated to deliver light to the display device 302.

Additionally, the sensor 376 may include a camera or plurality of cameras that may be configured to observe various fields of view around the HMD 300. In some examples, multiple video cameras may be provided, and each may be configured to capture the same view, or capture different views. For example, the sensor 376 may be a forward facing to capture at least a portion of the real-world view perceived by the user. This forward facing image captured by the sensor 376 may then be used to generate an augmented reality where computer generated images appear to interact with the real-world view perceived by the user.

The HMD 300 may also include a wired and/or wireless interface through which the processor 370 may exchange data with other computing systems or other devices, and through which any components of the HMD 300 may be coupled. For example, a wireless connection may be used including Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used.

In addition to the foregoing, the HMD 300 could also include other types of sensors, user interface components, and/or communication interface components, such as a speaker, a Hall effect sensor, reed switch, contact switch, force-sensing resistor, piezoresistive stave, capacitive sensor, conductive sensor, pressure sensor, gyroscope, or accelerometer, for example. In one example, the HMD 300 may include two nose pads and a sensor may operate between the two nose pads so as to determine a capacitive, conductive, or pressure present between the two nose pads. In another example, the HMD 300 may include an infrared proximity sensor or infrared trip sensor operated between one or more nose pads of the HMD 300.

In another example, the HMD 300 may include a detector 378. The detector 378 may be, for example, a camera configured to capture images and/or videos, in one or more portions of the electromagnetic spectrum (e.g., visible light, infrared, etc.). In one example, the detector 378 may be an eye-facing detector, configured to detect the presence of a user's eye. In another example, the detector 378 may be a motion sensing input device that uses, for example, an infrared projector and camera. Thus, the detector 378 may, in some examples captured three-dimensional (3D) data. The detector 378 may also include various lenses, optics, or other components to alter the focus and/or direction of the detector 378.

The processor 370 may control the content of the virtual images generated by the display systems 302, 304 and in response to various inputs. Such inputs may come from the touchpad 372, the microphone 374, the sensor 376, and/or a wired or wireless communication interfaces of HMD 300. The processor 370 may also control the content of the virtual images in response to gaze tracking, as described generally above. In this way, the processor 370 may control the content of the virtual images so that it is appropriate for the user's current surroundings and/or tasks in which the user is involved.

In some examples, the lens elements 312 and 314 may act as display elements, and the HMD 300 may include a projector (not shown) coupled to an inside surface of the extending side-piece 322 and configured to project a display onto an inside surface of the lens elements 312 and/or 314. Additionally or alternatively, a second projector may be coupled to an inside surface of the opposite side-piece 324 and configured to project a display onto an inside surface of the lens elements 312 and/or 314. In other examples, the lens elements 312 and 314 themselves may include a transparent or semi-transparent matrix display, such as an electroluminescent display or a liquid crystal display, one or more waveguides for delivering an image to the user's eyes, or other optical elements capable of delivering an in focus near-to-eye image to the user.

Figure 4:
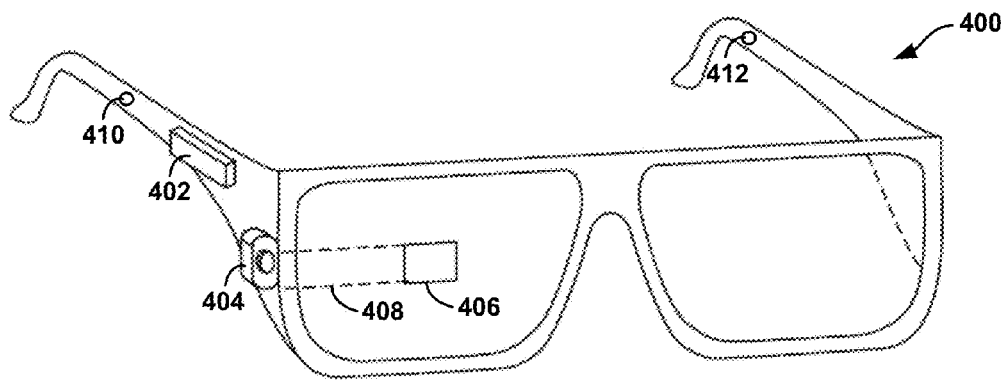
FIG. 4 illustrates another example system for receiving, transmitting, and displaying data.

FIG. 4 illustrates another example system 400 for receiving, transmitting, and displaying data. The system 400 is shown in the form of a wearable computing device. The system 400 may include frame elements and side-arms such as those described with respect to FIGS. 3A-3D. The system 400 may additionally include an on-board computing system 402 and a video camera 404. As shown in FIG. 4, the system 400 may include a single display 406 which may be coupled to the system 400. The display 406 may be formed on or coupled to one of the lens elements of the system 400, such as a lens element described with respect to FIGS. 3A-3D, and may be configured to overlay computer-generated graphics in the user's view of the physical world. The display 406 is controllable via the computing system 402 that is coupled to the display 406 via an optical waveguide 408 (e.g., a light pipe). Additionally, the system 400 may include one or more sensors 410, 412, which may be or include any of the sensors as describe with respect to FIGS. 3A-3D.

Figure 5:
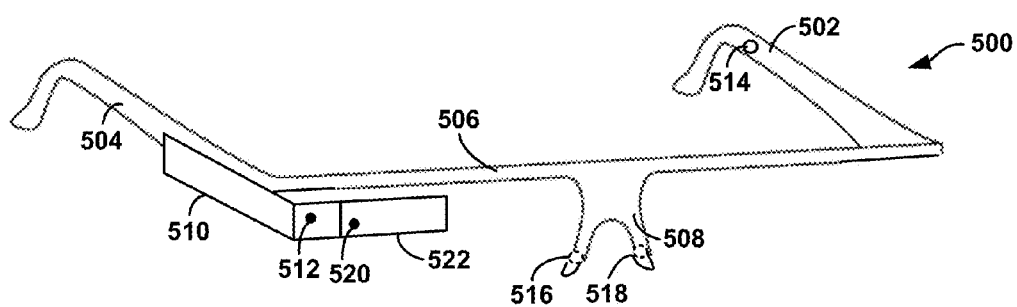
FIG. 5 illustrates yet another example system for receiving, transmitting, and displaying data.

FIG. 5 illustrates yet another example system 500 for receiving, transmitting, and displaying data. The system 500 is shown in the form of a wearable computing device. The system 500 may include side-arms 502 and 504, a center frame support 506, and a bridge portion with nosepiece 508. In the example shown in FIG. 5, the center frame support 506 connects the side-arms 502 and 504. The system 500 does not include lens-frames containing lens elements. The system 500 may additionally include an on-board computing system 510, a video camera 512, one or more sensors 514, 516, 518 and a detector 520 such as any of those described with respect to FIGS. 3A-3D.

The system 500 may include a single lens element 522 that may be coupled to the side-arm 504 or the center frame support 506. The lens element 522 may include a display such as the optical display system described in FIG. 2, and may be configured to overlay computer-generated graphics upon the user's view of the physical world. In one example, the single lens element 522 may be coupled to a side of the extending side-arm 504. The single lens element 522 may be positioned in front of or proximate to a user's eye when the system 500 is worn by a user. For example, the single lens element 522 may be positioned below the center frame support 506, as shown in FIG. 5.

Figure 6:
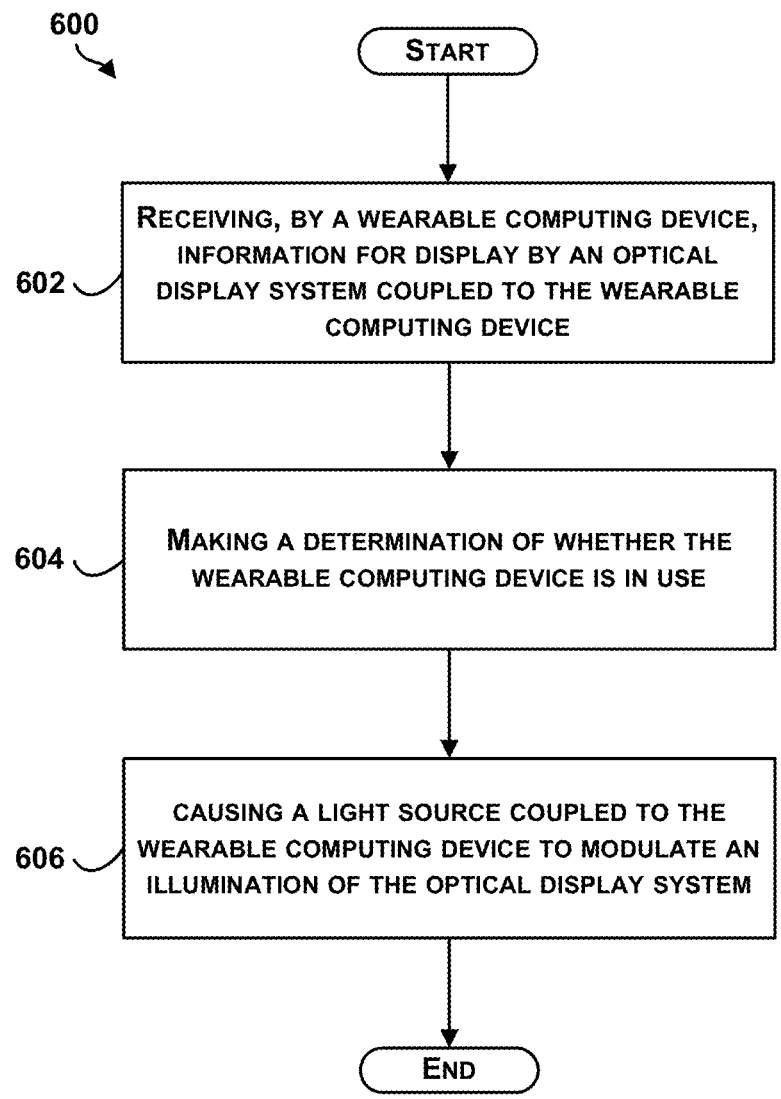
FIG. 6 is a block diagram of an example method of operating a device.

In some examples, one or more components of a computing system may be used to determine whether a wearable computing device is being worn based on an output of one or more sensors, and in response, cause a light source to modulate illumination of an optical display system. FIG. 6 is a block diagram of an example method 600 of operating a device. Method 600 shown in FIG. 6 presents an embodiment of a method that could be used with any of the systems of FIGS. 1-5, for example, and may be performed by a device, such as any devices illustrated in FIGS. 1-5, or components of the devices. Method 600 may include one or more operations, functions, or actions as illustrated by one or more of blocks 602-606. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Furthermore, for the method 600 and other processes and methods disclosed herein, each block in FIG. 6 may represent circuitry that is wired to perform the specific logical functions in the process.

Initially, at block 602, the method 600 includes receiving, by a wearable computing device, information for display by an optical display system coupled to the wearable computing device. The information may take any form such as graphics, text, audio data, etc.

In some examples, the optical display system may be in a form as described in FIG. 2, and may include a display panel and a viewing window. In other examples, the wearable computing device may be in a form of an eyeglass configuration and the optical display system may include an optical light pipe coupled to a frame of the eyeglass configuration. In still other examples, the wearable computing device may be in the form of a head-mountable device.

At block 604, the method 600 includes in response, making a determination of whether the wearable computing device is in use. For example, in response to the receipt of the information, the wearable computing device may be configured to determine if the wearable computing device is in use. In some instances, whether the wearable computing device is in use is based on wearable computing device is being worn.

The wearable computing device may be configured to make a determination of whether the wearable computing device is in use based on the receipt of any type of information for display, or based on certain types of information for display. Thus, the wearable computing device may first determine a type of information received (e.g., incoming email, phone call, data download), and then based on the type of information, the wearable computing device may be configured to provide a visual alert. If so, the wearable computing device may first determine whether the wearable computing device is in use.

In one example, the wearable computing device may include a sensor coupled to a sidearm of the wearable computing device, and may receive an output from the sensor. The output of the sensor may be indicative of whether the wearable computing device is being worn by a user of the wearable computing device. In particular, the sensor may be configured to identify bowing of the sidearm. The sensor may be a force-sensing resistor, piezoresistive stave, or other type of sensor configured to determine whether the sidearm is bending. In some examples, the sidearm may bend or bow away from the side of a user's head while the wearable computing device is being worn. The sensor may also determine an amount of stress, pressure, force, etc., impacting the sidearm. In some examples, an output of the sensor may be compared against a predetermined threshold to determine whether the wearable computing device is being worn. For instance, a user may configure the predetermined threshold by determining an average output of the sensor due to the stress on the sidearm while the wearable computing device is being worn. In one instance, when the output of the sensor is less than the predetermined threshold, a processor of the wearable computing device may determine the wearable computing device is not being worn.

In another example, the sensor may be configured to determine whether the sidearm is in a folded position with respect to a center frame of the wearable computing device. For example, a hinge unit may connect the sidearm to the center frame in a pivotal manner such that the sidearm is capable of being folded along an axis of the hinge unit. The sensor may include a first sensing component coupled to the sidearm and a second sensing component coupled to the center frame. The sensor may be configured such that the output of the sensor varies based on a proximity of the first sensing component to the second sensing component. For instance, the first sensing component may be a Hall effect sensor or a reed switch and the second sensing component may be a magnet. The output of the sensor may vary as the sidearm is folded towards the center frame, for example. In some instances, the center frame may be made out of a magnetic material and the second sensing component may be omitted. In other instances, the Hall effect sensor or the reed switch may be coupled to the center frame and the magnetic component may be coupled to the sidearm. Based on the proximity of the first sensing component to the second sensing component, the output of the sensor may be indicative of whether the wearable computing device is being worn. For example, the output may indicate that the sidearm is in a folded position, and thus, be indicative that the wearable computing device is not being worn.

In yet another example in which a first sensing component of the sensor may be coupled to the sidearm and a second sensing component may be coupled to the center frame, the first sensing component and the second sensing component may be configured such that the output of the sensor is based on contact of the first sensing component with the second sensing component. In one example, the first sensing component may contact the sensing component when the sidearm is in a folded position, toggling the state of a switch or circuit. The state of the switch or circuit may be conveyed to a processor of the wearable computing device.

In still another example, the sensor may be an accelerometer. An output of the accelerometer may be indicative of whether the wearable computing device is being worn. For example, the output of the accelerometer may be substantially constant, indicating the wearable computing device is not in motion, and the wearable computing device is not being worn.

In further examples, making a determination of whether the device is in use includes executing a time-out mechanism, such as if no inputs are received during a time period or no motion detected, then the determination may infer that the device is not in use.

In further examples, outputs of sensors may be indicative of whether a wearable computing device is being worn, however, outputs the sensors could have a false-positive in some situations. For instance, the sidearms of the wearable computing device may be in an unfolded position even though the wearable computing device is not being worn (e.g., a user may remove the wearable computing device and not fold the sidearms, or a user may lift the wearable computing device to the top of their head). In some instances, a combination of sensor outputs may be used to reliably determine whether a wearable computing device is being worn. For example, a first sensor output may include a Hall effect sensor, reed switch, and/or bend sensor used to determine whether the wearable computing device is being worn, and a second sensor output from an accelerometer may be used to confirm that the wearable computing device is being worn. Further, a third sensor including a resistive, capacitive, infrared, trip sensor, or conductive sensor coupled to one or more nose pads of the wearable computing device, may provide outputs indicative of whether the wearable computing device is being worn. In yet another example, the sensor may be or include an eye-facing camera, and an image or other output of the eye-facing camera may be processed to determine whether the wearable computing device is being worn. Any number or type of sensors and sensor outputs may be used to make a determination of whether the wearable computing device is in use.

At block 606, the method 600 includes based on the determination, causing a light source coupled to the wearable computing device to modulate an illumination of the optical display system. In one example, the optical display system is coupled to the wearable computing device via an optical transport element, and the light source may modulate an illumination of the optical transport element. The optical display system may be positioned adjacent a lens element of the wearable computing device, and the light source may modulate the illumination of the optical display system to cause light to radiate out of the optical display system in substantially all directions. Thus, the wearable computing device may be configured to increase light intensity provided to the optical transport element when the indication light is operated.

In examples in which the wearable computing device is not in use, and information has been received for display, the wearable computing device may be configured to flood the optical display system with light and cause the optical display system to glow. When doing so, the HMD may be off, or pixels of the HMD may not be operated for display. In one example operation, the wearable computing device may provide an indication or notification (e.g., "ring") when data is received for display by strobing a green light at high power. Lossly light leakage through an optical transport element may be sufficient to illuminate a certain region surrounding the wearable computing device.

In some examples, the optical display system may be similar to the system described in FIG. 2, and may include a display panel configured to generate a light pattern from which a virtual image is formed, based on received information, by spatially modulating light from a light source. When the wearable computing device is operated to cause the light source to modulate an illumination of the optical display system for indication of received information, the display panel may be idle and may simply reflect light from the light source. No image is formed or data displayed. Rather, the light source is operated to flood the optical display system with a high intensity light.

When illuminating the optical display system for an indication, rather than for a display of information, the light source may be operated at high power (e.g., max power). Using the method 600, existing hardware of the optical display system may be utilized for visual indication by operating the optical display system at higher power to illuminate the entire display panel area, for example.

The light source that is operated to modulate the illumination of the optical display system may be the same light source used to provide an illumination of the optical display when the wearable computing device is in use. For example, the light source may be RGB LEDs that is a primary illumination source of the wearable computing device. In other examples, the wearable computing device may include a white light source configured for use in black/white display systems that may be used to modulate the illumination of the optical display system for indication purposes. In still further examples, the wearable computing device may include a light source dedicated for the "not in use" notification, as described at block 606, that is configured to provide illumination of a certain color and intensity level.

In some examples, the wearable computing device may cause the light source to modulate the illumination of the optical display system by causing a light-emitting diode (LED) to illuminate in a blinking manner, or some predetermined on/off manner to provide an indication of a receipt of the information. In other examples, the modulation may take the form of multiple colors, rather than or in addition to a pattern.

In still other examples, a type or format of the modulation may be based on a type or content of the information received. As an example, the light modulation may be used to provide notifications, such that a color or pattern of the illumination is related to the type or content of information received. For instance, a green pulse light signal may be provided for an update received related to a social network, a high intensity short blue flash may be provided for a new instant message (IM), a blinking green signal may be provided for a received phone call, a red signal may be provided for a received e-mail, etc. The signals may be provided for any length of duration, and may, for example, be provided until an action has been made based on the received information (e.g., phone call answered, e-mail message read, etc.).

In other examples, the optical display system may be configured to include an electrochromic element, and the illumination may include causing a change in a surface appearance of the optical display system. The electrochromic element may change light transmission properties of the optical display system in response to voltage and thus allow control over the amount of light passing through. In some examples, the electrochromic element changes an opacity, such as changing between a colored, translucent state (e.g., blue) and a transparent state. Thus, the illumination effect may be enhanced by using electrochromics to make the optical transport element glass frosted. In these examples, light may diffuse through frosted glass, and the strobing light effect may be more apparent.

In some examples, the method 600 includes based on the determination being indicative of the wearable computing device not being in use, causing the light source to be operated at a first illumination output level, and based on the determination being indicative of the wearable computing device being in use, causing the light source to be operated at a second illumination output level. The second illumination output level may be lower than the first illumination output level. Thus, in instances in which the wearable computing device is not in use (e.g., not being worn), and information is received at the wearable computing device for display by the optical display system, the optical display system may first be used as an indicator to alert the user that new information is available for display. The indicator includes illuminating the optical display system at high levels that are brighter than illuminated during use of the wearable computing device. As an example, the light intensity of the optical display system may in the range of about 0 mW to about 20 mW when the wearable computing device is in use, and the light intensity level can be increased to a range of about 20 mW to about 100 mW for indication purposes. Additionally, the light pattern can be modulated (e.g., blinking or strobing effect) to demonstrate a visual alert.

In some examples, to cause the light source to be operated at a notification illumination level, the primary light source for illuminating the optical display may provide a visual indicator similar in brightness to that as provided when the wearable computing device is in use. Thus, the wearable computing device may include a light source dedicated for notification purposes that is capable of higher intensity output levels to provide a brighter notification.

In some examples, the method 600 includes after causing the light source to modulate the illumination of the optical display system, making a second determination of whether the wearable computing device is in use, and based on the second determination, causing the wearable computing device to switch to a display mode to display the information in the display mode. Thus, after illuminating the optical display system to the levels used for indication or "ringing" of the wearable computing device, the wearable computing device may then determine whether the device is in use (e.g., possibly 3-10 seconds after ringing). At that time, if the device is in use, the device may switch to the display mode.

In some examples, using the method 600, the wearable computing device may provide alerts, indications, or ringing effects to the user via visual alerts through use of the same optical display system that is used to display information to the user when the wearable computing device is in use. However, the visual alerts can be provided via illumination of the optical display system at higher levels of brightness than used when the wearable computing device is in use, or by modulating the illumination, as described above. Thus, the optical display system may be configured for a dual use; to display images/text related to received information, and to provide a visual indication at a high intensity value.

Figure 7A:
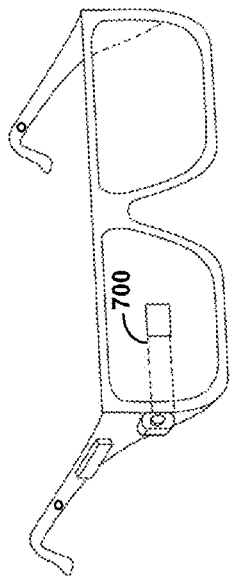
FIGS. 7-9 illustrate example devices configured to operate according to the method of FIG. 6.
Figure 7B:
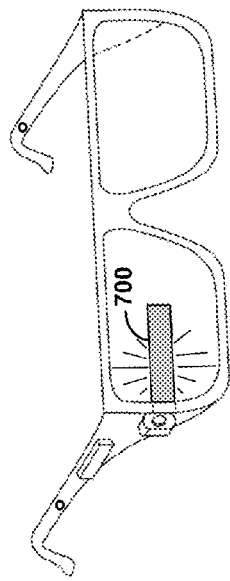

FIGS. 7-9 illustrate example devices configured to operate according to the method 600 of FIG. 6. In FIG. 7A, a front view of a wearable computing device is shown that includes an optical display system 700. In FIG. 7A, the optical display system 700 is not being operated to provide an indication. In FIG. 7B, the optical display system 700 is shown to be operated to provide an indication of receipt of information via illumination of the optical display system 700 (e.g., illumination of a light pipe).

Figure 8A:
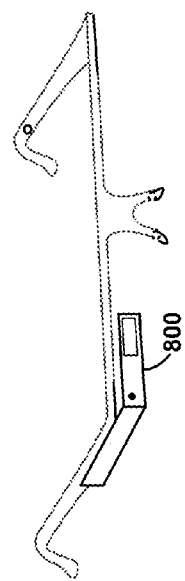
Figure 9A:
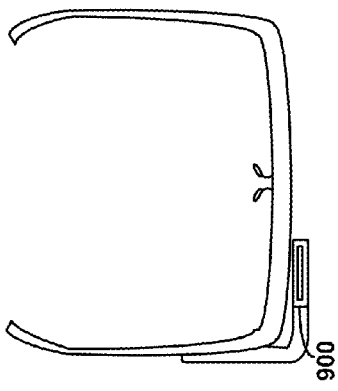
Figure 8B:
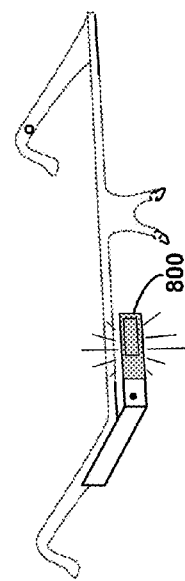
Figure 9B:
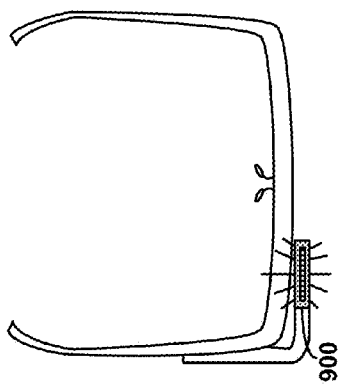

Similarly, in FIG. 8A, a front view of a wearable computing device is shown that includes an optical display system 800. In FIG. 8A, the optical display system 800 is not being operated to provide an indication. In FIG. 8B, the optical display system 800 is shown to be operated to provide an indication of receipt of information via illumination of the optical display system 800 (e.g., illumination of an entirely of the optical display system 800). FIG. 9A-9B illustrate top views of the wearable computing device of FIGS. 8A-8B. As shown, the optical display system may be operated to illuminate light in all directions.

Arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. Terminology used herein is for the purpose of describing particular embodiments only, and is not intended to be limiting.

What is claimed is:

1. A method comprising:
    receiving, by a wearable computing device, information for display by an optical display system coupled to the wearable computing device;
    in response, making a determination of whether the wearable computing device is in use; and
    based on the determination, causing a light source coupled to the wearable computing device to modulate an illumination of the optical display system, wherein:
        based on the determination being indicative of the wearable computing device not being in use, causing the light source to be operated at a first illumination output level; and,
        based on the determination being indicative of the wearable computing device being in use, causing the light source to be operated at a second illumination output level, wherein the second illumination output level is lower than the first illumination output level.

2. The method of claim 1, wherein the optical display system includes:
    a display panel configured to generate a light pattern by modulating light from the light source;
    an image former configured to form a virtual image from the light pattern generated by the display panel; and
    a beam splitter through which the virtual image is viewable along a viewing axis.

3. The method of claim 1, wherein the optical display system includes:
    a display panel configured to generate a light pattern by modulating light from the light source;
    a viewing window; and
    a light pipe configured to couple the display panel and the viewing window, and
    wherein causing the light source to modulate the illumination of the optical display system comprises causing the light source to modulate an illumination of the light pipe.

4. The method of claim 1, wherein the optical display system is coupled to the to the light source via an optical transport element, and wherein causing the light source to modulate the illumination of the optical display system comprises causing the light source to modulate an illumination of the optical transport element.

5. The method of claim 4, wherein the optical transport element is configured as an optical light pipe coupled to a frame of the wearable computing device.

6. The method of claim 1, wherein the wearable computing device is in a form of a head-mountable device.

7. The method of claim 1, wherein causing the light source coupled to the wearable computing device to modulate an illumination of the optical display system comprises causing a light-emitting diode (LED) to illuminate the optical display system in a blinking manner.

8. The method of claim 1, further comprising causing the light source coupled to the wearable computing device to change a type of modulation of the illumination of the optical display system based on content of the information received.

9. The method of claim 1, wherein the optical display system is configured to include an electrochromic element, and the method further comprises based on the determination causing a change in a surface appearance of the optical display system.

10. The method of claim 1, wherein making a determination of whether the wearable computing device is in use comprises determining whether the wearable computing device is being worn.

11. The method of claim 1, further comprising:
    after causing the light source to modulate the illumination of the optical display system, making a second determination of whether the wearable computing device is in use; and
    based on the second determination, causing the wearable computing device to switch to a display mode, wherein the wearable computing device is configured to display the information in the display mode.

12. The method of claim 1, wherein the optical display system is positioned adjacent a lens element of the wearable computing device,
    and wherein causing the light source coupled to the wearable computing device to modulate the illumination of the optical display system comprises causing light to radiate out of the optical display system in substantially all directions.

13. The method of claim 1, wherein the light source is configured to be operated at an intensity level when the wearable computing device is in use, and wherein causing the light source to modulate the illumination of the optical display system comprises increasing the intensity level of the light source.

14. The method of claim 1, further comprising:
    storing the received information for display;
    causing the light source coupled to modulate the illumination of the optical display system; and
    subsequently causing display of the received information by the optical display system upon determining that the wearable computing device is in use.

15. A non-transitory computer readable medium having stored therein instructions executable by a computing device to cause the computing device to perform functions comprising:
    receiving information for display by an optical display system coupled to the computing device;
    in response, making a determination of whether the computing device is in use; and
    based on the determination, causing a light source coupled to the computing device to modulate an illumination of the optical display system, wherein:
    based on the determination being indicative of the wearable computing device not being in use, causing the light source to be operated at a first illumination output level; and,
    based on the determination being indicative of the wearable computing device being in use, causing the light source to be operated at a second illumination output level, wherein the second illumination output level is lower than the first illumination output level.

16. The non-transitory computer readable medium of claim 15, wherein the instructions are further executable by the computing device to cause the computing device to perform functions comprising:
    causing the light source strobe various colors of light for the illumination of the optical display system.

17. The non-transitory computer readable medium of claim 15, wherein the light source is configured to be operated at an intensity level when the computing device is in use, and wherein the instructions are further executable by the computing device to cause the computing device to perform functions comprising:

causing the light source to increase the intensity level to modulate the illumination of the optical display system.

18. A wearable computing device comprising:
an optical display system
a light source coupled to the optical display system; and
a processor configured to:
  receive information for display by the optical display system;
  in response, make a determination of whether the wearable computing device is in use; and
  based on the determination, cause the light source to modulate an illumination of the optical display system, wherein:
  based on the determination being indicative of the wearable computing device not being in use, causing the light source to be operated at a first illumination output level; and,
  based on the determination being indicative of the wearable computing device being in use, causing the light source to be operated at a second illumination output level, wherein the second illumination output level is lower than the first illumination output level.

19. The wearable computing device of claim 18, wherein the optical display system includes:
  a display panel coupled to the light source and configured to generate a light pattern by modulating light from the light source based on the received information for display;
  a viewing window; and
  a light pipe configured to couple the display panel and the viewing window, and
  wherein the processor is configured to cause the light source to modulate an illumination of the light pipe.

20. The wearable computing device of claim 18, wherein the light source is configured to be operated at an intensity level when the wearable computing device is in use, and wherein the processor is configured to cause the light source to modulate the illumination of the optical display system by increasing the intensity level of the light source when the wearable computing device is not being worn.

21. The wearable computing device of claim 18, further comprising a second light source, and wherein the processor is configured to cause the light source to modulate the illumination of the optical display system for a notification, and to cause the second light source to illuminate the optical display system to display the received information.

* * * * *

UNITED STATES PATENT AND TRADEMARK OFFICE
CERTIFICATE OF CORRECTION

PATENT NO.          : 8,866,702 B1  
APPLICATION NO.     : 13/418867  
DATED               : October 21, 2014  
INVENTOR(S)         : Adrian Wong and Russell Mirov Page 1 of 1

It is certified that error appears in the above-identified patent and that said Letters Patent is hereby corrected as shown below:

In the Claims

Column 17, line 44, claim 4, delete "to the"

Signed and Sealed this
Twenty-seventh Day of October, 2015

Michelle K. Lee
*Director of the United States Patent and Trademark Office*